United States Patent
Schuppert et al.

(10) Patent No.: US 11,203,381 B2
(45) Date of Patent: Dec. 21, 2021

(54) BODY STRUCTURE FOR A VEHICLE

(71) Applicant: VOLKSWAGEN AKTIENGESELLSCHAFT, Wolfsburg (DE)

(72) Inventors: Eike Schuppert, Braunschweig (DE); Johannes Van De Wiel, Wustrow (DE); Mario Ubaldo, Wolfsburg (DE); Sören Krengel, Wolfsburg (DE); Uwe Weingarten, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 112 days.

(21) Appl. No.: 16/674,500

(22) Filed: Nov. 5, 2019

(65) Prior Publication Data
US 2020/0140017 A1    May 7, 2020

(30) Foreign Application Priority Data

Nov. 6, 2018  (DE) ................ 10 2018 218 851.3

(51) Int. Cl.
   *B62D 21/15*    (2006.01)
   *B62D 25/02*    (2006.01)
   (Continued)

(52) U.S. Cl.
   CPC .......... *B62D 21/157* (2013.01); *B62D 25/025* (2013.01); *B60K 2001/0438* (2013.01);
   (Continued)

(58) Field of Classification Search
   CPC .. B62D 21/157; B62D 25/025; B62D 29/008; B62D 27/065; B62D 27/02;
   (Continued)

(56) References Cited

U.S. PATENT DOCUMENTS

| 9,381,952 | B2* | 7/2016 | Furusaki | ................ B62D 25/16 |
| 2011/0175399 | A1* | 7/2011 | Nakano | ................ B62D 25/025 |
| | | | | 296/193.05 |

(Continued)

FOREIGN PATENT DOCUMENTS

| CN | 104114438 A | 10/2014 |
| CN | 108698647 A | 10/2018 |

(Continued)

OTHER PUBLICATIONS

Office Action for Chinese Patent Application No. 2019110760070, dated Oct. 11, 2021.

*Primary Examiner* — D Glenn Dayoan
*Assistant Examiner* — Dana D Ivey
(74) *Attorney, Agent, or Firm* — Pearl Cohen Zedek Latzer Baratz LLP

(57) ABSTRACT

A body structure for a vehicle has at least one side door sill that is made up of a door sill outer part on the outer side of the vehicle and a door sill inner part on the inner side of the vehicle, in the vehicle transverse direction, which delimit a door sill cavity that extends in the vehicle longitudinal direction between a front closing profile that closes off the door sill cavity in the direction of the front wheel housing, and a rear closing profile that closes off the door sill cavity in the direction of the rear wheel housing, wherein a reinforcement element, designed as an insert part, which extends in the vehicle longitudinal direction and acts as a side collision reinforcement is situated in the door sill cavity, and wherein in the event of a head-on collision the reinforcement element is acted on by a collision force directed toward the rear of the vehicle, in particular with load on at least one connecting point at which the reinforcement element is connected to the door sill. According to the invention, to relieve load on the connecting point, the reinforcement element is spaced apart from the rear closing profile by (Continued)

a longitudinal clearance space. A jacking point sheet metal part extends in the vertical vehicle direction, transversely through the longitudinal clearance space, and, in a head-on collision, the jacking point sheet metal part acts as a longitudinal stop by means of which longitudinal shifting of the reinforcement element is prevented.

14 Claims, 6 Drawing Sheets

(51) Int. Cl.
  *B62D 29/00* (2006.01)
  *B62D 27/06* (2006.01)
  *B60K 1/04* (2019.01)
  *B62D 27/02* (2006.01)
  *B62D 25/00* (2006.01)
(52) U.S. Cl.
  CPC ........... *B60Y 2306/01* (2013.01); *B62D 25/00* (2013.01); *B62D 27/02* (2013.01); *B62D 27/065* (2013.01); *B62D 29/008* (2013.01)
(58) Field of Classification Search
  CPC ............................ B62D 25/2036; B62D 25/00; B60Y 2306/01; B60K 2001/0438

USPC .................................................... 296/187.12
See application file for complete search history.

(56) References Cited

U.S. PATENT DOCUMENTS

| | | |
|---|---|---|
| 2013/0009424 A1 | 1/2013 | Herntier |
| 2015/0008703 A1 | 1/2015 | Furusaki et al. |
| 2016/0325786 A1 | 11/2016 | Elfwing |
| 2019/0039653 A1 | 2/2019 | Otsuka |

FOREIGN PATENT DOCUMENTS

| | | |
|---|---|---|
| DE | 19528874 A1 | 2/1997 |
| DE | 19615985 C1 | 8/1997 |
| DE | 10003878 A1 | 8/2001 |
| DE | 10 2004 062 932 A1 | 8/2006 |
| DE | 10 2005 044 820 A1 | 4/2007 |
| DE | 10 2010 050 826 A1 | 5/2012 |
| DE | 10 2011 116 626 A1 | 4/2013 |
| DE | 10 2012 020 432 B3 | 2/2014 |
| GN | 102862609 B | 10/2014 |
| GN | 106114648 A | 11/2016 |
| GN | 106184393 A | 12/2016 |
| GN | 108100040 A | 6/2018 |
| JP | 2001321845 A | 11/2001 |

* cited by examiner

BODY STRUCTURE FOR A VEHICLE

CROSS REFERENCE TO RELATED APPLICATION

This application claims priority from German Patent Application No. 10 2018 218 851.3, filed Nov. 6, 2018, which is incorporated by reference in its entirety.

FIELD OF THE INVENTION

The invention relates to a body structure for a vehicle.

BACKGROUND OF THE INVENTION

In an electrically operated two-track vehicle, a traction battery may be installed in the vehicle floor, extending in the vehicle transverse direction between the side door sills of the vehicle which delimit the side door openings of the vehicle body on the floor side. The traction battery installed in the vehicle floor, as a functional element that is vulnerable in a collision, must be protected from damage, in particular in a side pole collision.

In a generic body structure, the side door sill is made up a door sill outer part on the outer side of the vehicle and a door sill inner part on the inner side of the vehicle in the vehicle transverse direction, which delimit a door sill cavity. The door sill cavity extends in the vehicle longitudinal direction between a front closing profile that closes off the door sill cavity in the direction of the front wheel housing, and a rear closing profile that closes off the door sill cavity in the direction of the rear wheel housing.

A reinforcement element, designed as a separate insert part that extends in the vehicle longitudinal direction, is situated in the door sill cavity for protection of the traction battery installed in the vehicle floor. The reinforcement element may be implemented, for example, as an extruded aluminum profile that acts as a side collision reinforcement for protecting the traction battery.

With the upper door sill design, there is a risk, in particular in a head-on collision with little lateral overlap, that the reinforcement element facing the collision may be acted on by a collision force directed toward the rear of the vehicle. If the connecting points between the reinforcement element and the door sill rupture in this case, the reinforcement element may longitudinally shift with respect to the door sill, which has an adverse effect on the collision performance.

For this reason, in the prior art the connecting points between the reinforcement element and the door sill have a design with a large material and component outlay to avoid longitudinal shifting of the reinforcement element, even in a head-on collision with little lateral overlap.

A floor assembly for a vehicle is known from DE 196 15 985 C1, having means for increasing occupant protection. A motor vehicle body having a door sill is known from DE 10 2011 116 626 A1. A door sill structure for a vehicle body is known from DE 10 2012 020 432 B3.

The object of the invention is to provide a body structure for a vehicle, in which the collision performance of the body structure may be maintained with simple design means, even in a head-on collision with little lateral overlap.

SUMMARY OF THE INVENTION

The object is achieved by the features of the independent claims. Preferred refinements of the invention are disclosed in the dependent claims.

The invention is based on the basic concept of incorporating a jacking point sheet metal part, which is already integrated into the door sill, in securing the position of the reinforcement element in order to avoid disadvantageous longitudinal shifting of the reinforcement element in the event of a head-on collision. In light of this background, according to the characterizing part of claim 1 the reinforcement element is spaced apart from the rear closing profile by a longitudinal clearance space. The jacking point sheet metal part extends in the vertical vehicle direction, transversely through the provided longitudinal clearance space. In this way, in a head-on collision the jacking point sheet metal part acts as a longitudinal stop by means of which longitudinal shifting of the reinforcement element in the door sill is prevented.

In one technical implementation, the door sill outer part and the door sill inner part may be connected to one another at an upper flange connection and at a lower flange connection. In this case, the jacking point sheet metal part may have a middle portion that extends transversely through the door sill cavity. The middle portion may be adjoined at the top by an upper joining flange in the vertical vehicle direction. Similarly, a lower joining flange may adjoin at the bottom in the vertical vehicle direction. The upper and lower joining flanges of the jacking point sheet metal part are respectively situated between the upper edge flanges and between the lower edge flanges of the door sill inner and outer parts to form a three-layer flange connection.

With regard to simple assembly of the door sill and compensation for component and manufacturing tolerances, it is preferred when the jacking point sheet metal part is spaced apart from the reinforcement element by a free longitudinal offset. For bridging the free longitudinal offset, the jacking point sheet metal part may be extended with at least one sheet metal bracket that is connected to the reinforcement element at a connecting point. The sheet metal bracket may be formed from the same material and/or molded onto the jacking point sheet metal part in one piece. With regard to simple compensation for component or manufacturing tolerances, it is advantageous for the sheet metal bracket to be kept as a separate sheet metal part and, for example, brought into a welded connection with the middle portion of the jacking point sheet metal part situated in the door sill cavity.

In the assembled position, the reinforcement element on its top side may be spaced apart from a door sill profile top by a free installation gap. Similarly, the reinforcement element on its bottom side may be spaced apart from a door sill profile base by a free height offset.

With regard to sufficient collision performance and a rigidly joined connection of the reinforcement element to the door sill, it is preferred that the jacking point sheet metal part with an upper sheet metal bracket and with a lower sheet metal bracket is connected to the reinforcement element. In this case, the upper sheet metal bracket of the jacking point sheet metal part is fastened to the reinforcement element top side, while the lower sheet metal bracket is fastened to the reinforcement element bottom side, in a manner that is favorable with regard to installation space.

With regard to a rigidly joined connection of the reinforcement element, it is preferred that the lower sheet metal bracket has a flat base body that is in flat contact with the reinforcement element bottom side. In addition, the lower sheet metal bracket may have a support tab that is angled away from the flat base body, and via which the reinforcement element is supportable on the door sill profile base. In one design embodiment variant, the support tab may be offset at a longitudinal distance from the jacking point sheet metal part. In addition, the support tab may bridge the lower height offset, and may be situated between the lower edge flanges of the lower flange connection to form a three-layer structure.

On its side facing the reinforcement element, the middle portion of the jacking point sheet metal part has a stop edge that may abut against the reinforcement element if necessary in a head-on collision. In order for the jacking point sheet metal part to be able to provide a proper stop function in the event of a head-on collision, it is preferred that the stop base provided by the jacking point sheet metal part is as large as possible. Against this background, the middle portion at its stop edge may merge into a stop tab, which in particular is bent at a right angle. Thus, during a head-on collision the reinforcement element with its rear side may abut against the stop tab of the jacking point sheet metal part, which has a larger surface area compared to the stop edge.

In addition, the stop function of the jacking point sheet metal part may be enhanced by a framework-like structure. Against this background, an inner corner area having a component-reinforcing action may extend between the middle portion, the stop tab, and the flat base body of the lower sheet metal bracket. The stop tab at a transition edge facing the lower sheet metal bracket may preferably merge into a support flange that is supported on the flat base body of the lower sheet metal bracket, and which is thus fixedly connected to a connecting point if necessary in order to implement the inner corner area.

Furthermore, it is preferred when the middle portion of the jacking point sheet metal part has a double-wall structure made up of two contacting sheet metal layers in order to increase the component rigidity. With regard to implementing such a double-wall structure having a simple design, the middle portion on its side facing away from the stop edge in the vehicle longitudinal direction may have a folded edge. The folded edge defines a folding axis about which the two sheet metal layers, preferably made from the same material and designed in one piece, merge into one another at the folded edge.

To further increase the component rigidity, the middle portion of the jacking point sheet metal part may have at least one longitudinal ridge. The longitudinal ridge may protrude from a middle portion base surface with a predefined ridge height, in the vehicle transverse direction. The longitudinal ridge may preferably extend directly to the stop edge of the middle portion. In this way, the stop base provided by the stop edge may be elevated in the vehicle transverse direction.

For the case of a double-wall design of the middle portion, it is particularly preferred when the longitudinal ridge is formed in one sheet metal layer (for example, the outer sheet metal layer in the vehicle transverse direction), and the other sheet metal layer (for example, the inner sheet metal layer in the vehicle transverse direction) is designed as a cover part that covers a hollow profile of the longitudinal ridge. This results in a closed ridge hollow profile having a rigid design.

The upper and lower joining flanges, preferably together with the longitudinal ridge, may all be formed in one of the two sheet metal layers. Alternatively and/or additionally, the upper and/or lower joining flange(s) may extend to the level of the stop edge of the middle portion in the vehicle longitudinal direction. In this case, the stop edge may extend, without steps or interruptions, from the middle portion to the upper and/or lower joining flange. A joining flange that is extended in this way in the vehicle longitudinal direction brings about an increase in the pressure stability and bending stability, and provides an additional connection surface on the door sill.

The stop base provided by the jacking point sheet metal part may be further increased as follows: The stop tab may be molded onto one sheet metal layer of the double-wall middle portion, while the longitudinal ridge may be molded onto the other sheet metal layer. The longitudinal ridge and the stop tab may preferably protrude from the sheet metal layers in opposite directions from one another in the vehicle transverse direction.

BRIEF DESCRIPTION OF THE DRAWINGS

Exemplary embodiments of the invention are described below with reference to the appended figures.

In the figures.

DETAILED DESCRIPTION OF THE INVENTION

Figure 1:
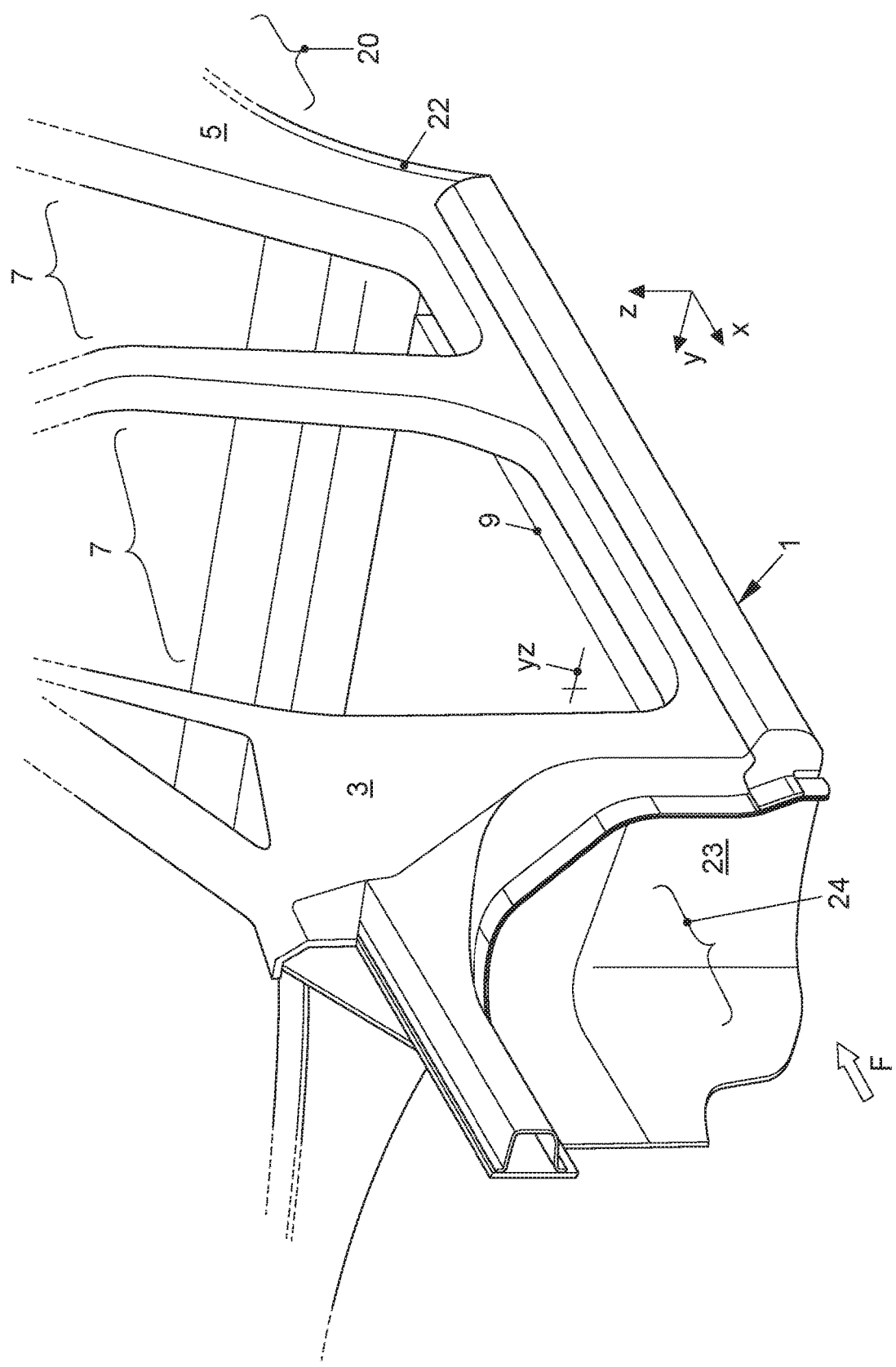
FIG. 1 shows a perspective partial three-dimensional view of a body structure of a two-track motor vehicle.

FIG. 1 shows a body structure of a two-track motor vehicle, which is described below to the extent necessary for an understanding of the invention. Accordingly, the body structure has a floor-side door sill 1 on each side in the transverse direction y, only one door sill being shown in FIG. 1. The door sill 1 extends continuously in the vehicle longitudinal direction x, between a front A-pillar 3 and a rear C-pillar 5, and delimits side door openings 7 on the floor side. A traction battery 9 that is vulnerable in a collision extends between the two door sills 1 in the vehicle transverse direction y, and is installed in the vehicle floor of the body structure.

Figure 2:
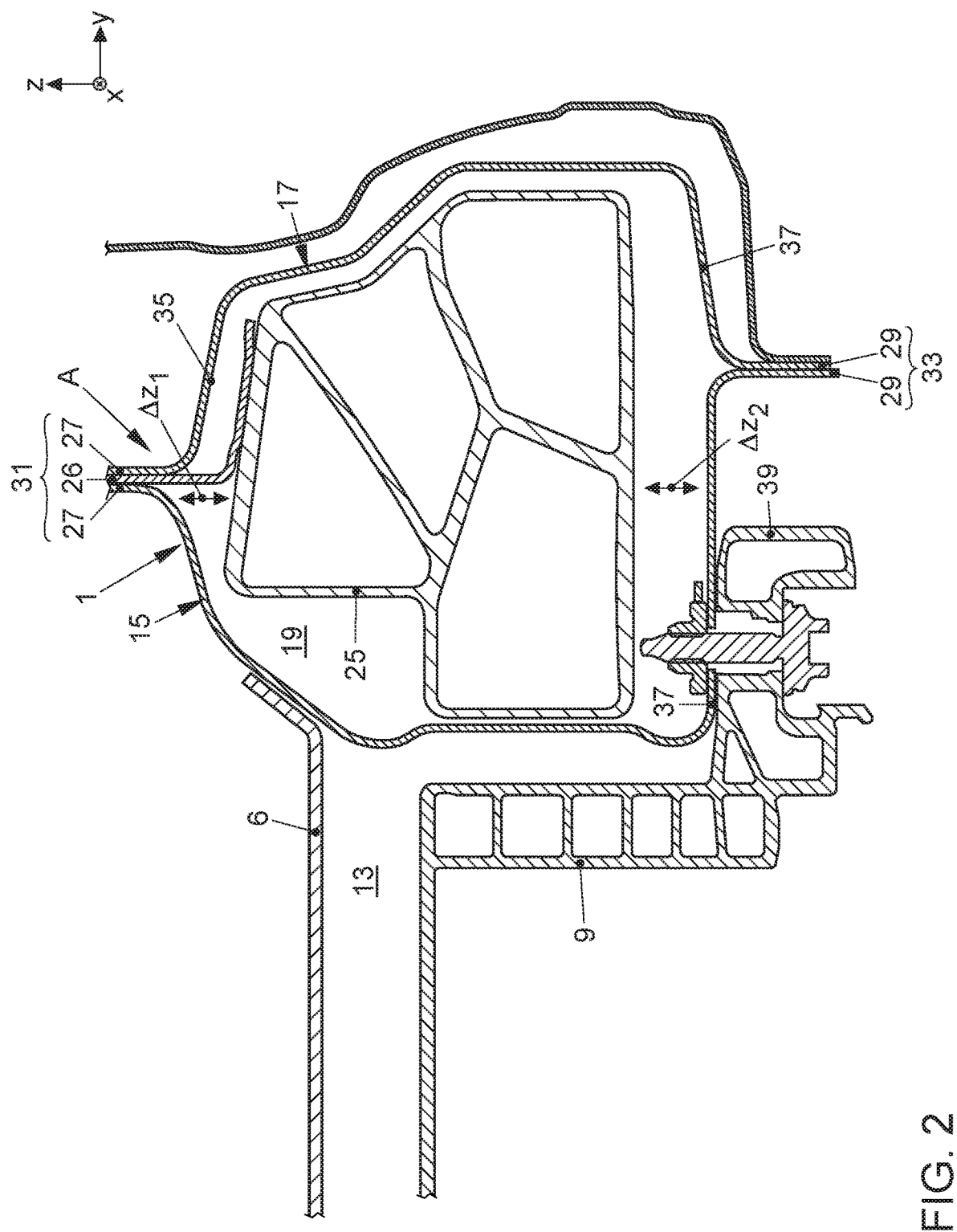
FIG. 2 shows a partial sectional illustration along the section plane xy from FIG. 1.

The door sill 1 in FIG. 2 is designed as a hollow beam, in particular with a door sill inner part 15 on the inner side of the vehicle, in the vehicle transverse direction y, and a door sill outer part 17 on the outer side of the vehicle, in the vehicle transverse direction y. These door sill inner and outer parts delimit a door sill cavity 19, which in the vehicle longitudinal direction x is closed off by a front closing profile 23 in the direction of a front wheel housing 24. Similarly, the door sill cavity 19 on the inner side of the vehicle is closed off at the rear of the vehicle by a rear closing profile 23 in the direction of a rear wheel housing 25. A floor panel 6 that delimits an installation space 13 for the traction battery 9 on the bottom side of the vehicle is joined to the door sill inner part 15. Only one housing of the traction battery 9 is illustrated in FIG. 2.

As also shown in FIG. 2, a reinforcement element 25 that is designed as an insert part and protects the collision-vulnerable traction battery 9 in the event of a side pole collision extends in the door sill cavity 19. According to FIG. 2, the door sill inner part 15 has a shell-shaped design in the profile cross section. Similarly, the door sill outer part 17 also has a shell-shaped design. The two door sill parts 15, 17 have edge flanges 27, 29 that are angled upwardly and downwardly, respectively, and that are connected to one another to form an upper flange connection 31 and a lower flange connection 33.

The reinforcement element 25 may be fastened within the door sill 1 via screw, spot welding, and/or adhesive connections. As an example, FIG. 2 shows a connecting point A having an angled profile 26 by means of which the reinforcement element 25 is correctly positioned in the door sill cavity 19. The angled profile 26 is joined between the upper edge flanges 27 of the door sill parts 15, 17. In addition, the reinforcement element 25 is spaced apart from a door sill profile top 35 with a free height offset $\Delta z_1$, and is spaced apart from a door sill profile base 37 with a further free height offset $\Delta z_2$. The door sill profile base 37 in FIG. 2 additionally forms a screw-on base to which a housing flange 39 of the traction battery 9 may be screwed from the bottom side of the vehicle.

Figure 3:
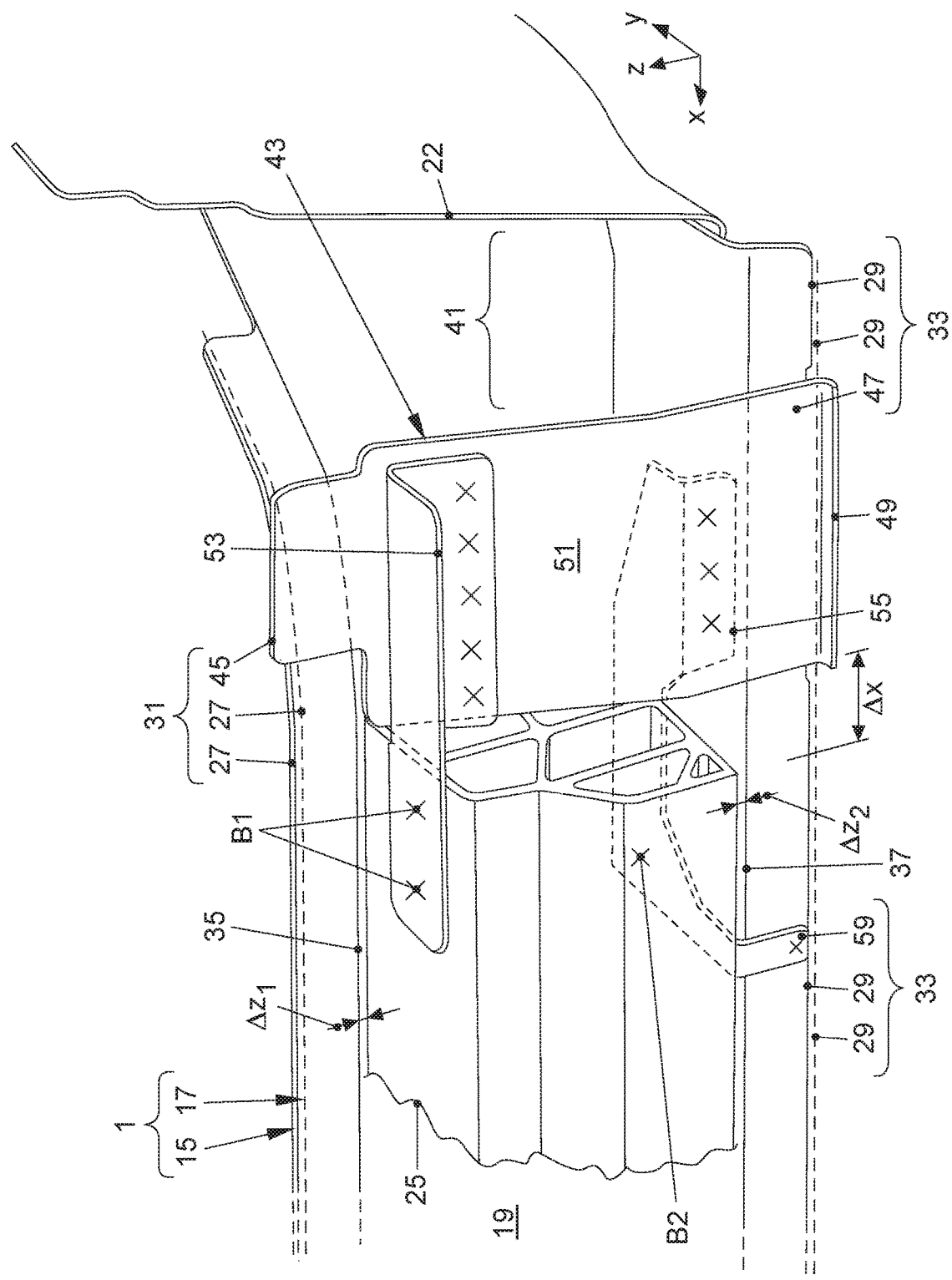
FIG. 3 shows a perspective partial three-dimensional view of a door sill area on the rear side.

As further shown in FIG. 3, at the rear of the vehicle the reinforcement element 25 is spaced apart from the rear closing profile 22 with a longitudinal clearance space 41. A jacking point sheet metal part 43 extends through the longitudinal clearance space 41, transversely in the vertical vehicle direction z, and in a head-on collision described below acts with slight lateral overlap as a longitudinal stop, thus preventing longitudinal shifting of the reinforcement element 25, which is disadvantageous for the collision performance. In FIG. 3, the outer part 17 of the door sill 1 on the outer side of the vehicle is only indicated by dashed lines for reasons of clarity.

In the assembled position (FIG. 3), the jacking point sheet metal part 43 is situated with an upper joining flange 45 between the two upper edge flanges 27 of the door sill parts 15, 17 of the upper flange connection 31 to form a three-layer structure. Similarly, a lower joining flange 47 of the jacking point sheet metal part 43 is situated between the lower edge flanges 29 of the two door sill parts 15, 17 of the lower flange connection 33 to form a three-layer structure. The lower joining flange 47 of the jacking point sheet metal part 43 is exposed with a jacking point engagement section 49 on the bottom side of the vehicle. The two upper and lower joining flanges 45, 47 are connected to one another via a middle portion 51 of the jacking point sheet metal part 43 situated in the door sill cavity 19.

In FIG. 3, the jacking point sheet metal part 43 is positioned behind the reinforcement element 25 with a longitudinal offset $\Delta x$. An upper sheet metal bracket 53 and a lower sheet metal bracket 55 are provided in FIGS. 3 and 4 for bridging the longitudinal offset $\Delta x$. These upper and lower sheet metal brackets each protrude, starting from the jacking point sheet metal part 43 and going to the front of the vehicle, in the manner of a cantilever arm. According to FIG. 3, the upper sheet metal bracket 53 is welded to the side of the middle portion 51 of the jacking point sheet metal part 43 pointing toward the outer side of the vehicle. Similarly, the lower sheet metal bracket 55 is welded to the middle portion 51 of the jacking point sheet metal part on the inner side of the vehicle.

The upper sheet metal bracket 53 of the jacking point sheet metal part 43 is connected to the reinforcement element top side at the upper connecting point B1 (FIG. 3). In contrast, the lower sheet metal bracket 55 of the jacking point sheet metal part 43 is connected to the reinforcement element bottom side at the lower connecting point B2.

Figure 4:
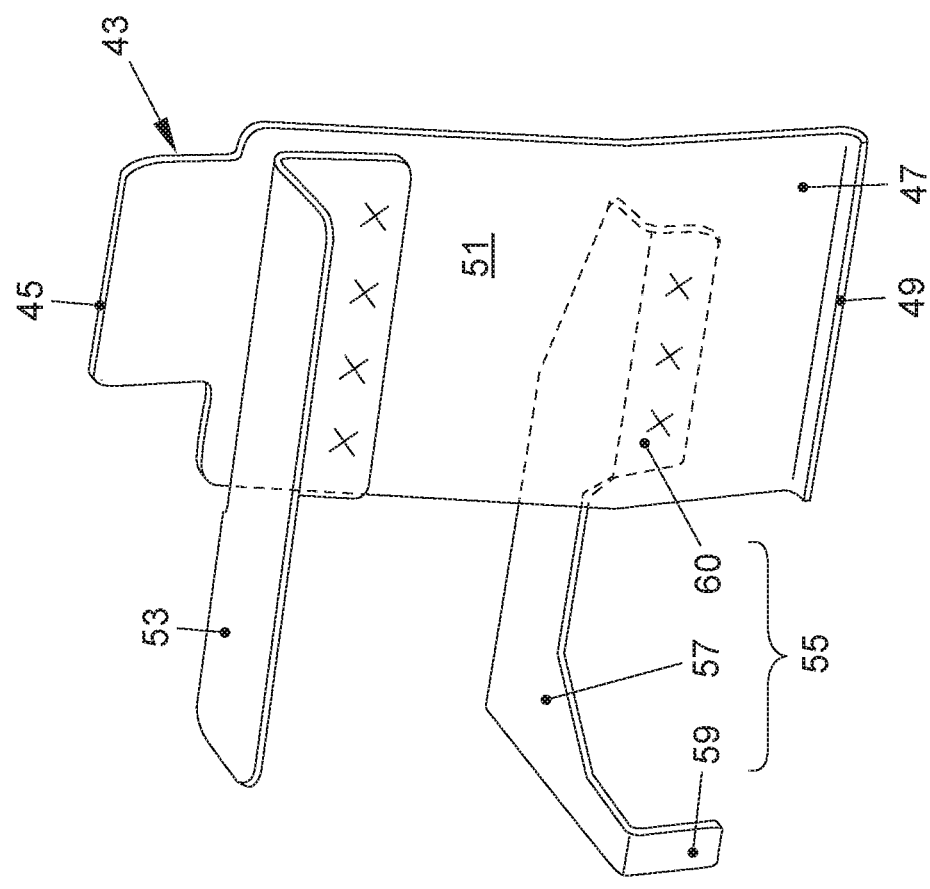
FIG. 4 shows an isolated illustration of a jacking point sheet metal part that is installed in the rear side of a door sill area according to one exemplary embodiment.

In FIGS. 3 and 4, the lower sheet metal bracket 55 has a base body 57 with a large surface area that is in contact with the reinforcement element bottom side. A fastening tab 60 (FIG. 4) for fastening to the jacking point sheet metal part 43, as well as a support tab 59, are angled away from the flat base body 57 of the lower sheet metal bracket 55. The support tab 59 bridges the lower installation gap $\Delta z_2$, and is positioned between the two lower edge flanges 29 of the door sill parts 15, 17 to form a three-layer lower flange connection 33. In FIGS. 3 and 4, the support tab 59 is offset from the jacking point sheet metal part 43 via a free longitudinal distance. Additional support of the reinforcement element 25 on the door sill profile base 37 is thus provided via the support tab 59.

During a head-on collision, the jacking point sheet metal part 43 described above acts with a slight lateral overlap as follows: In such a head-on collision, there is a greatly increased transmission of the collision force F (FIG. 1) laterally outside the body side members, in particular to form a lateral load path in which the vehicle wheel rim facing the collision is pressed against the A-pillar 3, and the collision force F is further transmitted into the body side structure, i.e., into the reinforcement element 25 via the front closing profile 23, in particular with load on the connecting points A between the reinforcement element 25 and the door sill (FIG. 2). The jacking point sheet metal part 43 positioned in the door sill cavity 19 at the rear of the vehicle as well as the two sheet metal brackets 53, 55 provided thereon act as a longitudinal stop for the reinforcement element 25, thus limiting longitudinal shifting of the reinforcement element 25 in the door sill 1 as a result of the collision. The connecting points A between the door sill 1 and the reinforcement element 25 may thus be relieved of load, thereby preventing rupture of the connecting points A.

Figure 5:
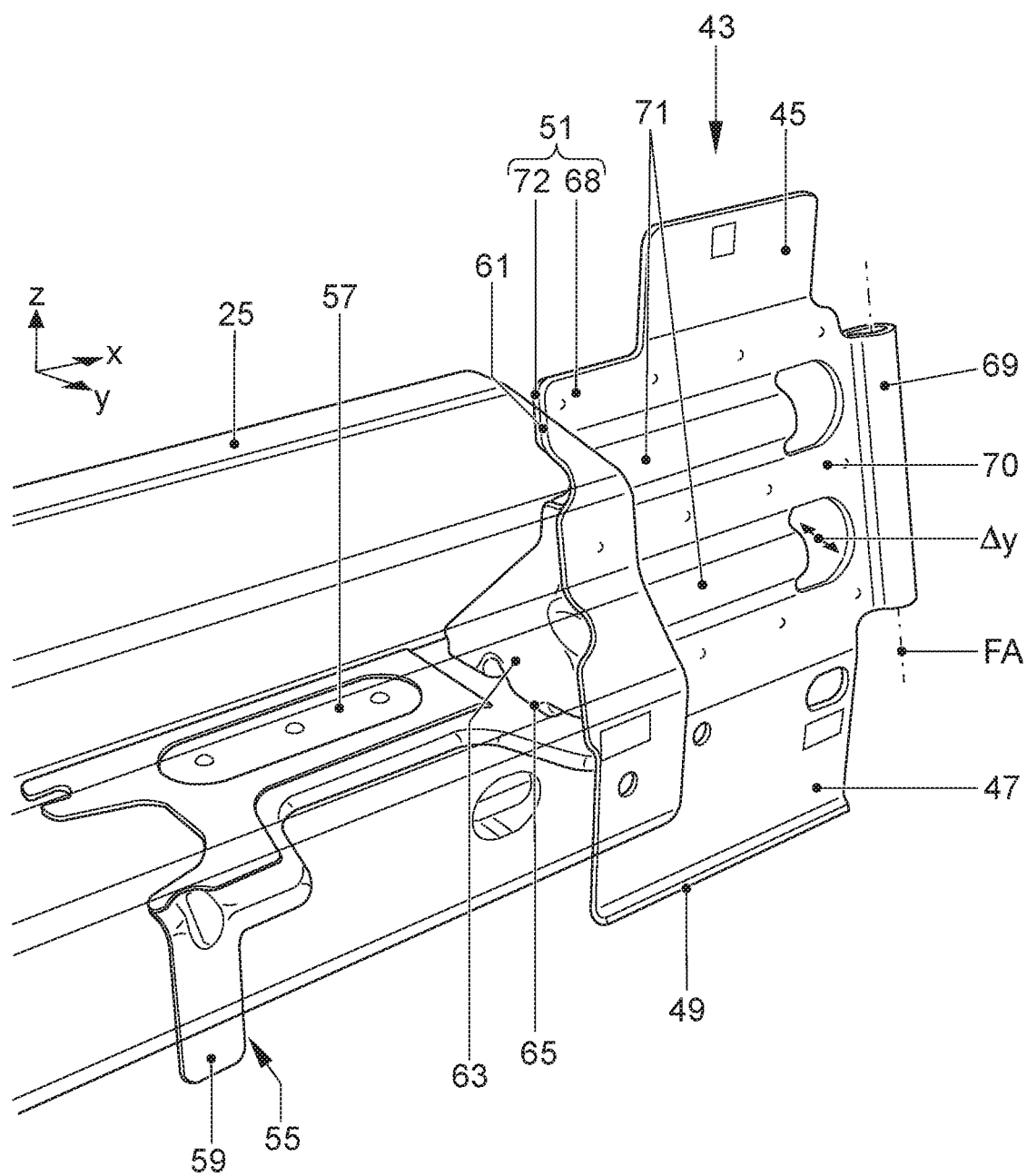
FIGS. 5 and 6 show different perspective views of a jacking point sheet metal part according to a second exemplary embodiment.
Figure 6:
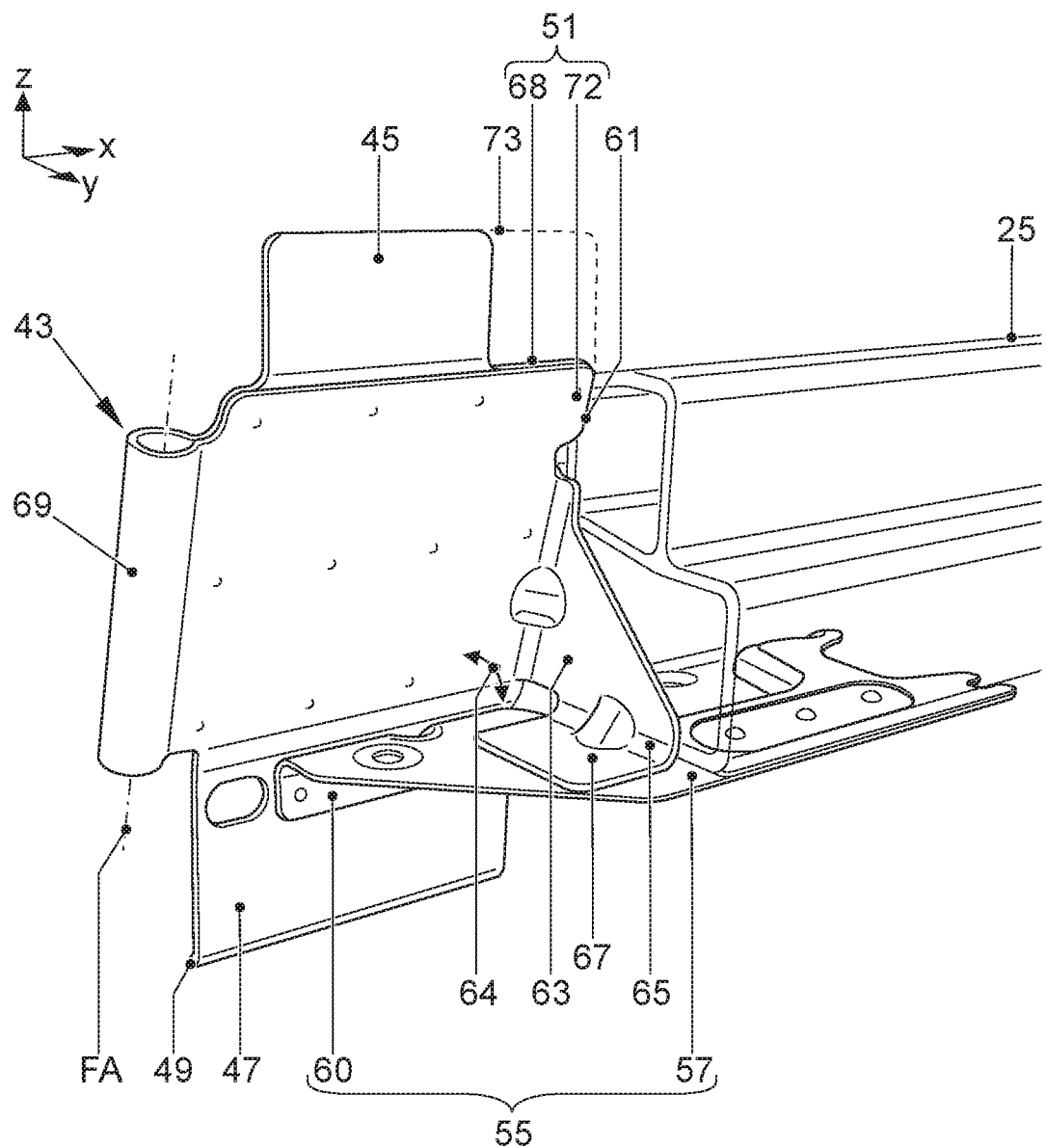

FIGS. 5 and 6 show the jacking point sheet metal part 43 according to a second exemplary embodiment. The basic design and operating principle of the jacking point sheet metal part 43 are identical to the exemplary embodiment shown in FIGS. 2 through 4. In contrast to the first exemplary embodiment, additional measures are taken in FIGS. 5 and 6 to increase the pressure stability and bending stability of the jacking point sheet metal part 43 in the event of a head-on collision:

Accordingly, the middle portion 51 has a double-wall design, in particular with a sheet metal layer 68 on the outer side of the vehicle in the vehicle transverse direction y, and a sheet metal layer 72 which is thus in flat contact with same on the inner side of the vehicle. The two sheet metal layers 68, 72, made from the same material and designed in one piece, merge into one another at a folded edge 69. The folded edge 69 is situated opposite from the stop edge 61 at the front of the vehicle, in the vehicle longitudinal direction x, and defines a folding axis FA about which the two sheet metal layers 68, 72 are folded.

The upper sheet metal bracket 53 is omitted in FIG. 5. Instead, the middle portion 51 above the lower sheet metal bracket 55 has two longitudinal ridges 71. The two longitudinal ridges 71 are molded into the sheet metal layer 68 on the outer side of the vehicle, and protrude from a middle portion base surface 70 with a ridge height $\Delta y$ (FIG. 5) toward the outer side of the vehicle. According to FIG. 5, the two longitudinal ridges 71 extend directly to the front stop edge 61 of the middle portion 51 of the jacking point sheet metal part 43.

In contrast, the sheet metal layer 72 of the double-wall middle portion 51 on the inner side of the vehicle is designed with an essentially flat surface area in FIG. 6. In FIGS. 5 and 6, the sheet metal layer 72 on the inner side of the vehicle acts as a cover part that covers the hollow profile of the two longitudinal ridges 71, thus forming a closed ridge hollow profile having a rigid design.

As also shown in FIG. 6, at the stop edge 61 the sheet metal layer 72 of the middle portion 51 on the inner side of the vehicle merges into a stop tab 63 that is bent at a right angle toward the inner side of the vehicle. In FIG. 6, the stop tab 63 has a transition edge 65, facing the lower sheet metal bracket 55, from which a support flange 67 is angled away. The support flange 67 in FIG. 6 is supported on the flat base body 57 of the lower sheet metal bracket 55, and is connected thereto by a spot weld, for example.

In this way, the jacking point sheet metal part 43 together with the lower sheet metal bracket 55 forms a framework structure with rigid components, in which an inner corner area 64 (FIG. 6) having a component-reinforcing effect extends between the sheet metal layer 72 on the inner side of the vehicle, the stop tab 63, and the flat base body 57 of the lower sheet metal bracket 55.

The stop tab 63 that is molded onto the sheet metal layer 72 on the inner side of the vehicle, and the longitudinal ridges 71 that are formed in the sheet metal layer 68 on the outer side of the vehicle, protrude from the respective sheet metal layer 68, 72 in opposite directions from one another in the vehicle transverse direction y. In this way, with a simple design the jacking point sheet metal part 43 provides a stop base that is elevated in the vehicle transverse direction y.

In FIGS. 5 and 6, the upper and lower joining flanges 45, 47 as well as the two longitudinal ridges 71 in the sheet metal layer 68 on the outer side of the vehicle are made from the same material and molded on in one piece, while the stop tab 63 is molded onto the sheet metal layer 72 on the inner side of the vehicle.

In FIG. 6, the upper joining flange 45 is extended with a flange extension 73, indicated with a dashed line, toward the front of the vehicle in the vehicle longitudinal direction x, to the level of the stop edge 61 of the middle portion 51. In this case, the stop edge 61 extends from the middle portion 51, without steps or interruptions, to the upper and lower joining flanges 45, 47. This results in an improved connection to the door sill 1.

LIST OF REFERENCE SYMBOLS 1 door sill
3 A-pillar
5 C-pillar
6 floor panel
7 side door opening
9 traction battery
13 installation space
15 door sill inner part
17 door sill outer part
19 door sill cavity
20 rear wheel housing
22 rear closing profile
23 front closing profile
24 front wheel housing
25 reinforcement element
26 angled profile
27 upper edge flanges
29 lower edge flanges
31 upper flange connection
33 lower flange connection
25 door sill profile corner
37 door sill profile base
39 housing flange
41 longitudinal free clearance
43 jacking point sheet metal part
45 upper joining flange
47 lower joining flange
49 engagement section
51 middle portion
53 upper sheet metal bracket
55 lower sheet metal bracket
57 flat base body
59 support tab
60 fastening tab
61 stop edge
63 stop tab
64 inner corner area
65 transition edge
67 support flange
68 sheet metal layer on the outer side of the vehicle
69 folded edge
70 middle portion base surface
71 longitudinal ridges
72 sheet metal layer on the inner side of the vehicle
73 flange extension
F collision force
A, B1, B2 connecting points
FA folding axis
Δy ridge height

The invention claimed is:

1. A body structure for a vehicle, having:
at least one side door sill that is made up of a door sill outer part on an outer side of the vehicle and a door sill inner part on an inner side of the vehicle, in the vehicle transverse direction, which delimit a door sill cavity that extends in the vehicle longitudinal direction between a front closing profile that closes off the door sill cavity in the direction of a front wheel housing, and a rear closing profile that closes off the door sill cavity in the direction of a rear wheel housing,
a reinforcement element, designed as an insert part, which extends in the vehicle longitudinal direction and acts as a side collision reinforcement, situated in the door sill cavity,
wherein, in the event of a head-on collision, the reinforcement element is acted on by a collision force directed toward a rear of the vehicle, in particular with load on at least one connecting point at which the reinforcement element is connected to the door sill,
wherein, in order to relieve load on the connecting point, the reinforcement element is spaced apart from the rear closing profile by a longitudinal clearance space, and
a jacking point sheet metal part extending in the vertical vehicle direction, transversely through the longitudinal clearance space,
wherein, in a head-on collision, the jacking point sheet metal part acts as a longitudinal stop by means of which longitudinal shifting of the reinforcement element is prevented.

2. The body structure according to claim 1, wherein
the door sill outer part and the door sill inner part are connected to one another at an upper flange connection and at a lower flange connection,
the jacking point sheet metal part has a middle portion that extends transversely through the door sill cavity, which middle portion is adjoined at the top by an upper joining flange and is adjoined at the bottom by a lower joining flange, in the vertical vehicle direction, and
the upper and lower joining flanges are respectively situated between the upper edge flanges and between the lower edge flanges of the door sill inner and outer parts to form a three-layer flange connection.

3. The body structure according to claim 2, wherein
the middle portion of the jacking point sheet metal part has a stop edge that faces the reinforcement element, which middle portion at its stop edge merges into a stop tab which is bent at a right angle, and
the reinforcement element abuts against the stop tab of the jacking point sheet metal part in the event of a head-on collision.

4. The body structure according to claim 3, wherein
an inner corner area having a component-reinforcing action extends between the middle portion, the stop tab, and the flat base body of the lower sheet metal bracket, and/or
the stop tab at a transition edge facing the lower sheet metal bracket merges into a support flange that is supported on the flat base body of the lower sheet metal bracket.

5. The body structure according to claim 2, wherein
the middle portion of the jacking point sheet metal part has a double-wall structure made up of two contacting sheet metal layers, and
in order to form the double-wall structure, the middle portion on its side facing away from the stop edge in the vehicle longitudinal direction has a folded edge that defines a folding axis about which the two sheet metal layers are folded.

6. The body structure according to claim 2, wherein
the middle portion has at least one longitudinal ridge that protrudes from a middle portion base surface with a ridge height in the vehicle transverse direction, and/or
the longitudinal ridge extends directly to the stop edge of the middle portion, thus elevating a stop base, provided by the stop edge, in the vehicle transverse direction.

7. The body structure according to claim 6, wherein
the longitudinal ridge is formed in one sheet metal layer, on the outer side of the vehicle, of the middle portion having a double-wall design, and
the other sheet metal layer, on the inner side of the vehicle, as a cover part covers the hollow profile of the longitudinal ridge, in order to form a closed ridge hollow profile having a rigid design.

8. The body structure according to claim 7, wherein
the stop tab is formed on the inner, sheet metal layer of the middle portion,
the longitudinal ridge is formed on the other sheet metal layer, and
the longitudinal ridge and the stop tab protrude from the respective sheet metal layers in opposite directions from one another in the vehicle transverse direction.

9. The body structure according to claim 2, wherein
the upper and lower joining flanges, together with the longitudinal ridge, are all formed in one of the two sheet metal layers, and/or
the upper and/or lower joining flange(s) extend(s) to the level of the stop edge of the middle portion in the vehicle longitudinal direction, so that the stop edge extends, without steps or interruptions, from the middle portion to the upper and/or lower joining flange.

10. The body structure according to claim 1, wherein
the jacking point sheet metal part is spaced apart from the reinforcement element by a longitudinal offset, and
for bridging the longitudinal offset, the jacking point sheet metal part is extended with at least one sheet metal bracket that is connected to the reinforcement element at a connecting point.

11. The body structure according to claim 10, wherein
the reinforcement element on its top side is spaced apart from a door sill profile top by an installation gap, and on its bottom side is spaced apart from a door sill profile base by an installation gap, and/or
an upper sheet metal bracket of the jacking point sheet metal part is fastened to the reinforcement element top side at an upper connecting point, and/or
a lower sheet metal bracket of the jacking point sheet metal part is fastened to the reinforcement element bottom side at a lower connecting point.

12. The body structure according to claim 11, wherein
the lower sheet metal bracket has a flat base body that is in contact with the reinforcement element bottom side at the lower connecting point, and
the lower sheet metal bracket has a support tab that is angled away from the flat base body, and via which the reinforcement element is supportable on the door sill profile base.

13. The body structure according to claim 12, wherein
the support tab is offset at a longitudinal distance from the jacking point sheet metal part, and/or
the support tab bridges the lower installation gap, and/or
the support tab is situated between the lower edge flanges of the lower flange connection to form a three-layer structure.

14. The body structure according to claim 10, wherein the at least one sheet metal bracket, as a separate sheet metal part, is connected to the jacking point sheet metal part, on the middle portion of the jacking point sheet metal part situated in the door sill cavity.

* * * * *